United States Patent
Marek et al.

[11] Patent Number: 5,966,269
[45] Date of Patent: Oct. 12, 1999

[54] HEAD SUSPENSION WITH CONNECTED ACTUATOR ARM AND LOAD BEAM IN A LAMINATE, MONOCOQUE CONSTRUCTION

[75] Inventors: Stevenson J. Marek, Hutchinson; Mark T. Girard, South Haven, both of Minn.

[73] Assignee: Hutchinson Technology, Inc., Hutchinson, Minn.

[21] Appl. No.: 08/915,055

[22] Filed: Aug. 20, 1997

Related U.S. Application Data

[60] Provisional application No. 60/025,008, Aug. 21, 1996.

[51] Int. Cl.$^6$ ........................................................ G11B 5/60
[52] U.S. Cl. ........................................................ 360/104
[58] Field of Search ............................................ 360/104

[56] References Cited

U.S. PATENT DOCUMENTS

| | | | |
|---|---|---|---|
| 4,408,238 | 10/1983 | Hearn | 360/104 |
| 4,949,194 | 8/1990 | Macpherson et al. | 360/104 |
| 4,991,045 | 2/1991 | Oberg | 360/104 |
| 5,184,265 | 2/1993 | Foote et al. | 360/106 |
| 5,283,704 | 2/1994 | Reidenbach | 360/104 |
| 5,319,512 | 6/1994 | Grapenthin | 360/106 |
| 5,363,262 | 11/1994 | Drennan | 360/106 |
| 5,446,611 | 8/1995 | Webber | 360/104 |
| 5,491,599 | 2/1996 | Sogabe | 360/106 |
| 5,550,694 | 8/1996 | Hyde | 360/104 |
| 5,627,702 | 5/1997 | Kelemen et al. | 360/106 |
| 5,629,820 | 5/1997 | Koriyama | 360/104 |
| 5,654,851 | 8/1997 | Tucker et al. | 360/104 |
| 5,666,243 | 9/1997 | Brent | 360/106 |
| 5,717,549 | 2/1998 | Jurgenson | 360/106 |
| 5,731,931 | 3/1998 | Goss | 360/104 |
| 5,734,526 | 3/1998 | Symons | 360/104 |

FOREIGN PATENT DOCUMENTS

| | | | |
|---|---|---|---|
| 0 555 969 | 8/1993 | European Pat. Off. | G11B 5/48 |
| 0 564 762 | 10/1993 | European Pat. Off. | G11B 5/54 |
| 8203224 | 9/1996 | Japan | G11B 21/02 |
| WO 95/13610 | 5/1995 | WIPO | G11B 5/55 |
| WO 97/43757 | 11/1997 | WIPO | G11B 5/48 |

*Primary Examiner*—John H. Wolff
*Attorney, Agent, or Firm*—Faegre & Benson LLP

[57] ABSTRACT

A head suspension for supporting a read/write head of a rotary data storage device combines an actuator arm and load beam in a longitudinally compact construction. The construction includes overlapping laminae with one laminae extending over a hole provided in the other laminae, resulting in a monocoque construction of the head suspension that minimizes rotational inertia while maintaining desirable levels of shock, resonance and deflection performance of the head suspension.

25 Claims, 11 Drawing Sheets

HEAD SUSPENSION WITH CONNECTED ACTUATOR ARM AND LOAD BEAM IN A LAMINATE, MONOCOQUE CONSTRUCTION

REFERENCE TO RELATED APPLICATION

This application claims the benefit of U.S. Provisional application Ser. No. 60/025,008, filed Aug. 21, 1996 and entitled 'Extended Baseplate/Etched Arm Suspension'.

BACKGROUND OF THE INVENTION (1) Field of the Invention

The present invention pertains to a head uspension for supporting a read/write head adjacent a rotary data storage device, and in particular to a head suspension having an actuator arm and load beam connected in a laminate, monocoque construction that minimizes mass and rotational inertia of the head suspension while maintaining or improving the head suspension stiffness, shock, resonance and deflection performance.

(2) Description of the Related Art

Figure 15:
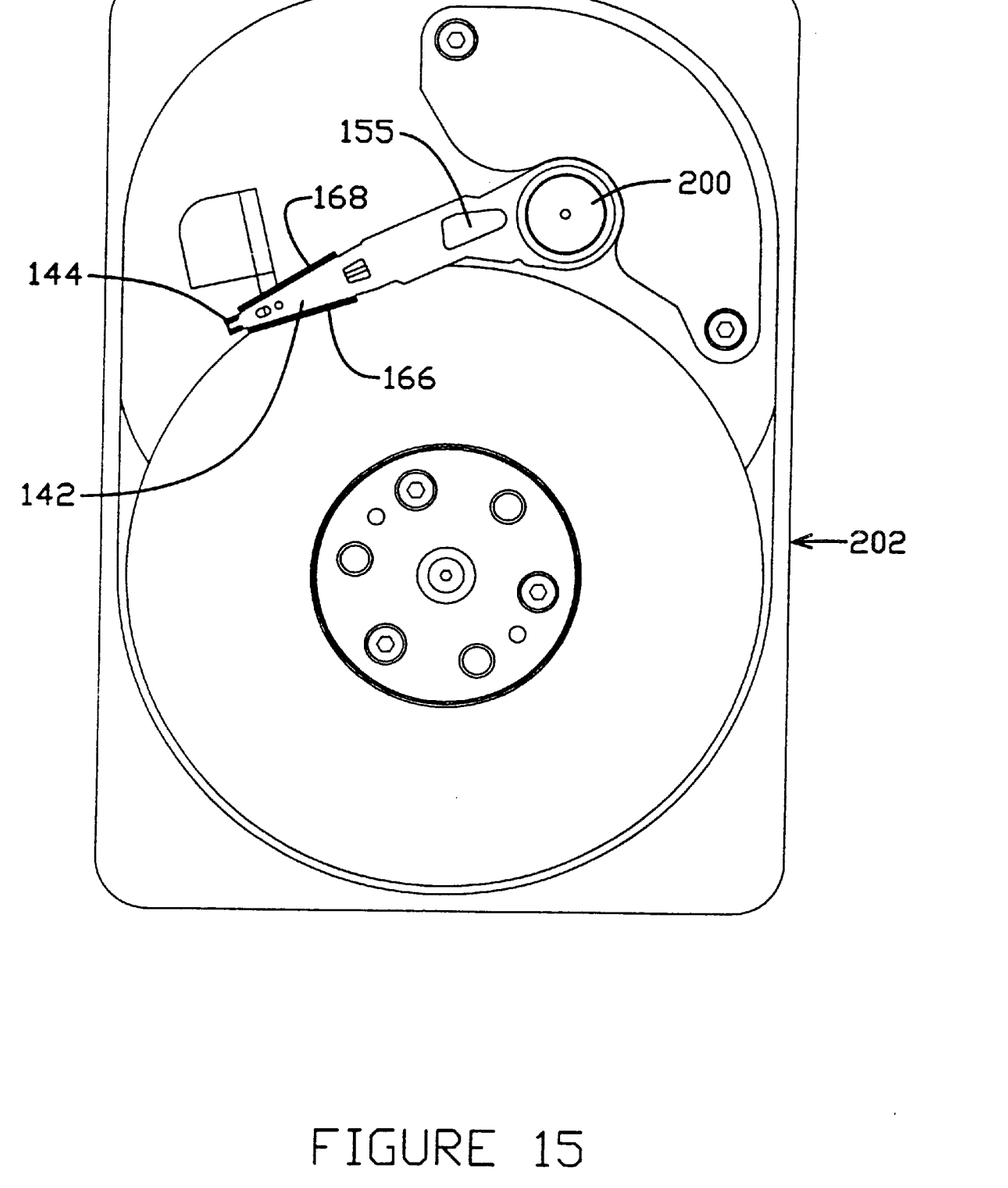
FIG. 15 is a schematic illustration of a rotary data storage device utilizing a head suspension in accordance with the present invention.

Most personal computer systems today employ direct access storage devices (DASD) or rigid disk drives for data storage. A conventional disk drive 210, such as shown in FIG. 15, contains a disk spindle that is rotated by an electric motor at several thousand revolutions per minute (RPM) while the disk drive is turned on. A plurality of magnetically coated recording disks 206 are mounted on the spindle for rotation therewith at axially spaced positions along the spindle. The number of disks and the composition of their magnetic material coating determines, in part, the data storage capacity of the disk drive.

Positioned adjacent the peripheries of the rotating disk 206 is a head actuator column 212. The head actuator column has a plurality of actuator arms 214 thereon, and each actuator arm supports one or more head suspensions 230 that extend in cantilever fashion from the actuator arm to distal ends of the head suspensions. In dynamic storage devices optical or magnetic read/write heads are supported on sliders, referered to collectively as 208, at the distal ends of each of the head suspensions 230. The plurality of actuator arms and their associated head suspensions support the read/write heads adjacent the top and bottom surfaces of each of the plurality of disks supported by the spindle.

Typically, the load beam of each head suspension is welded or secured in an equivalent manner to a base plate, and the base plate in turn is secured to the head actuator column.

In the pursuit of improving head suspension designs, the prime objective is to optimally balance low mass with a high enough rigidity or stiffness for any given head suspension design. Competing with the need for rigidity in the head suspension is the need to give the head suspension as low a mass as possible to minimize rotational inertia of the head suspension created by its rapid positioning movements and to reduce sensitivity to shock. This is especially true in the reduced size rigid disk drives employed in notebook and laptop computers where the disks are smaller and their data storage density is increased.

Figure 1:
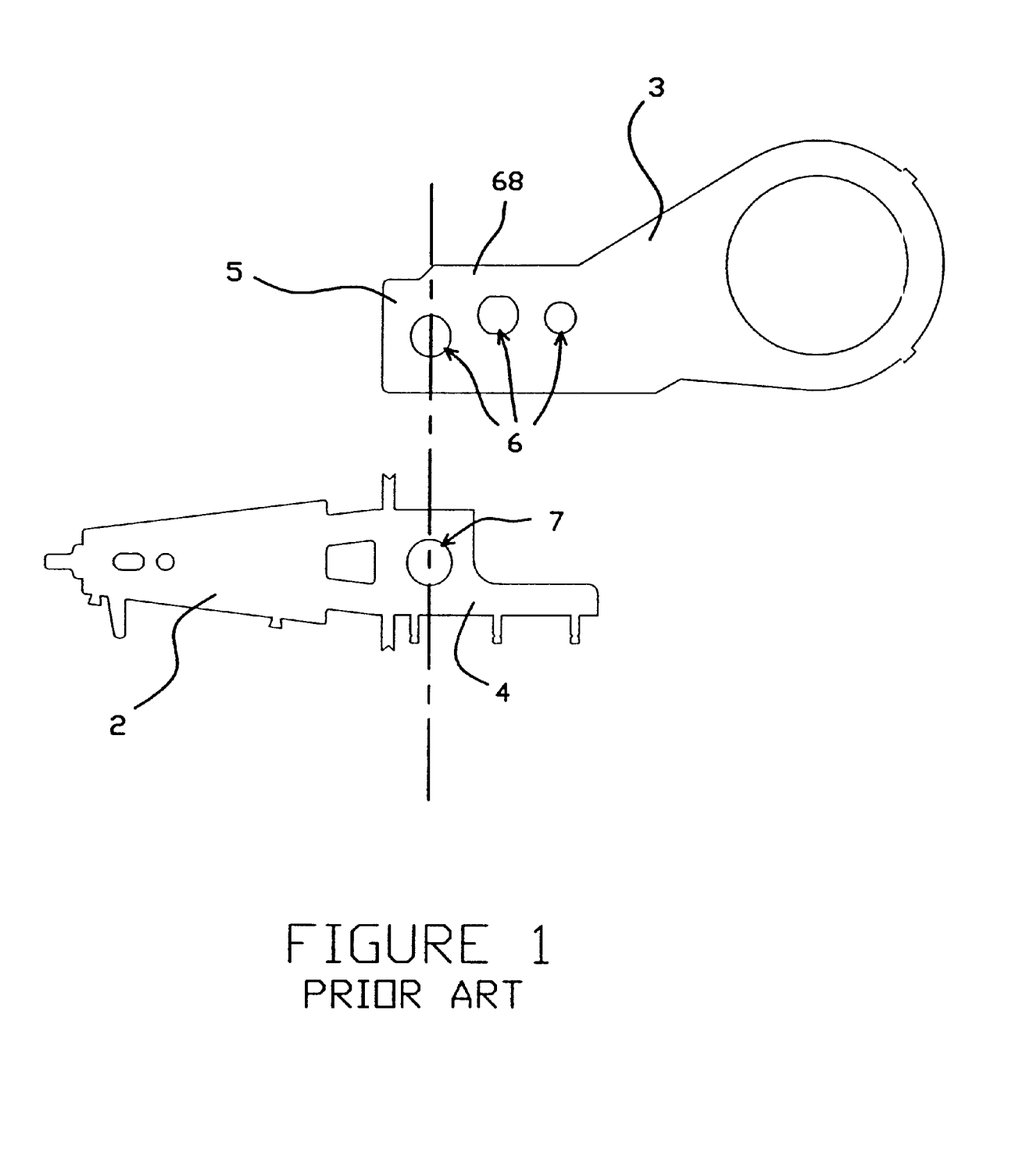
FIG. 1 is a plan view of a prior art actuator arm and load beam.

FIG. 1 shows one prior art design of a head suspension which achieves a reduction in the overall mass of the head suspension while maintaining desirable levels of rigidity and stiffness. In this prior art design, a load beam 2 is assembled directly to an actuator arm 3. The mass of the head suspension is reduced by eliminating the base plate and its mass. The actuator arm is provided with mass reduction holes 6 and the forward or distal most mass reduction hole 6 in the distal region 5 of the actuator arm may also be employed as a tooling aperture that aligns with a tooling aperture 7 provided in the proximal region of the load beam 2 when assembling the load beam to the actuator arm. The proximal region 4 of the load beam, when assembled to the actuator arm distal region 5, runs along a lateral side of the actuator arm 3 adjacent but spaced from the weight reduction apertures 6 of the actuator arm. The projecting proximal portion of the load beam 4 is secured to the distal region 5 of the actuator arm by spot welds, adhesives or other equivalent methods.

In an effort to further improve the balance between reduced mass and increased rigidity or stiffness of a head suspension, the design concept of the present invention was arrived at where the head suspension is constructed as a laminate of a load beam and actuator arm that contains hollow cavities within the laminate construction giving the suspension a monocoque construction with enhanced stiffness and reduced mass.

SUMMARY OF THE INVENTION

The present invention provides a head suspension having a reduced mass, rigid construction achieved by combining an actuator arm and load beam in a laminate, monocoque construction. The actuator arm that connects the head suspension to the actuator head column of the rotary data storage device is made an integral part of the head suspension. The actuator arm is constructed with holes in a distal region of the arm that reduce the mass of this region of the arm and thereby minimize the rotational inertia of the head suspension. In various embodiments of the head suspension, the actuator arm holes are made passing completely through the actuator arm distal region, or extending only partially into the actuator arm distal region to recessed surfaces of the holes positioned between opposite top and bottom surfaces of the arm.

The load beam is secured to the actuator arm distal region with portions of the load beam proximal region covering over at least portions of the actuator arm holes, or with a separate flexure extension covering over at least portions of the actuator arm holes in an embodiment of the head suspension that combines the actuator arm and load beam in a single, monolithic piece. The laminate construction of the actuator arm and load beam creates a monocoque construction where portions of the actuator arm holes are covered by portions of the load beam. The monocoque construction provides the increased rigidity and stiffness required of a head suspension without appreciably increasing the rotational inertia of the head suspension due to the reduction in mass provided by the holes in the actuator arm distal region. Making the actuator arm a part of the head suspension decreases the overall mass of the head suspension while maintaining a high enough rigidity or stiffness of the head suspension by making the actuator arm a part of the head suspension.

BRIEF DESCRIPTION OF THE DRAWINGS

Further objects and features of the present invention are set forth in the following detailed description of the preferred embodiments of the invention and in the drawing figures wherein.

DETAILED DESCRIPTION OF THE PREFERRED EMBODIMENTS

The head suspension of the invention is described by referring to several variant embodiments of the invention. Each head suspension embodiment is basically a laminate constructed of two laminae. In the embodiments, an actuator arm serves as one of the laminae, and either a load beam or an extended flexure serves as the other laminae, or a load beam and flexure serve as the two laminae. In each of the embodiments, the laminae have mutually opposed interior surfaces and one or more holes formed into the interior surface of the actuator arm prior to the attachment of the load beam or flexure extension to the actuator arm. In different embodiments, the hole extends into the actuator arm to a recessed surface of the arm in the hole or extends completely through the actuator arm.

Figure 2:
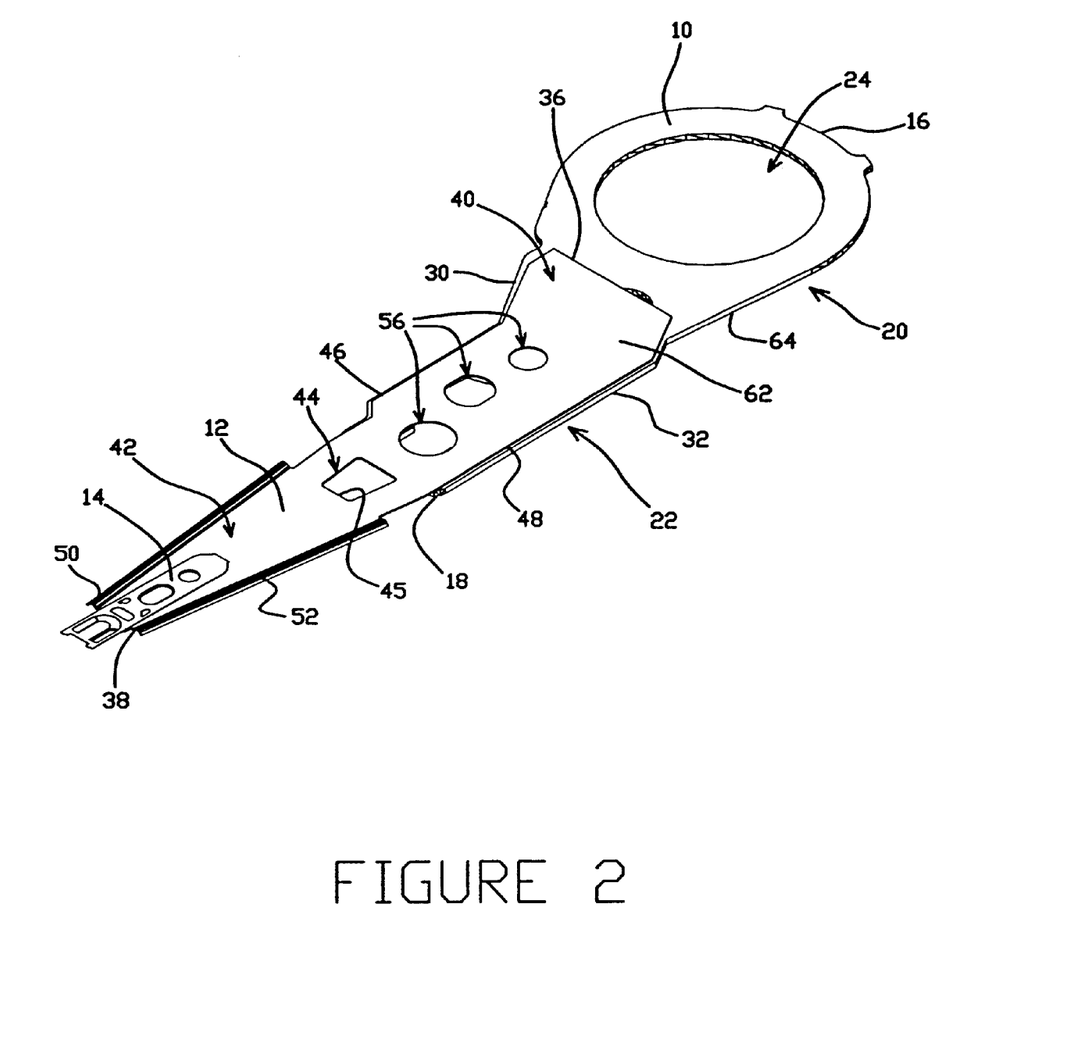
FIG. 2 is an isometric view of a first embodiment of the head suspension of the invention.
Figure 3:
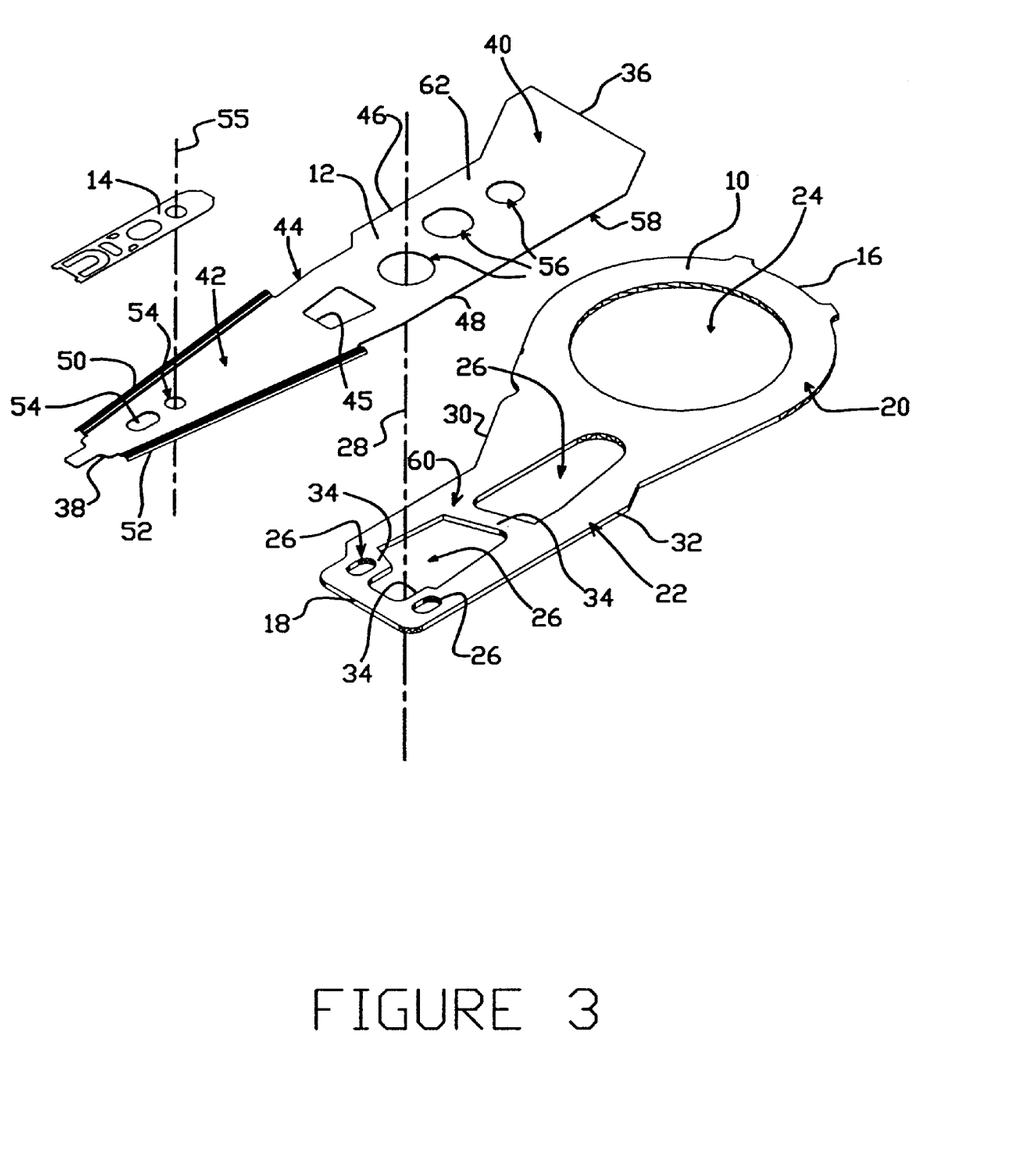
FIG. 3 is an exploded isometric view of the head suspension of FIG. 2.
Figure 4:
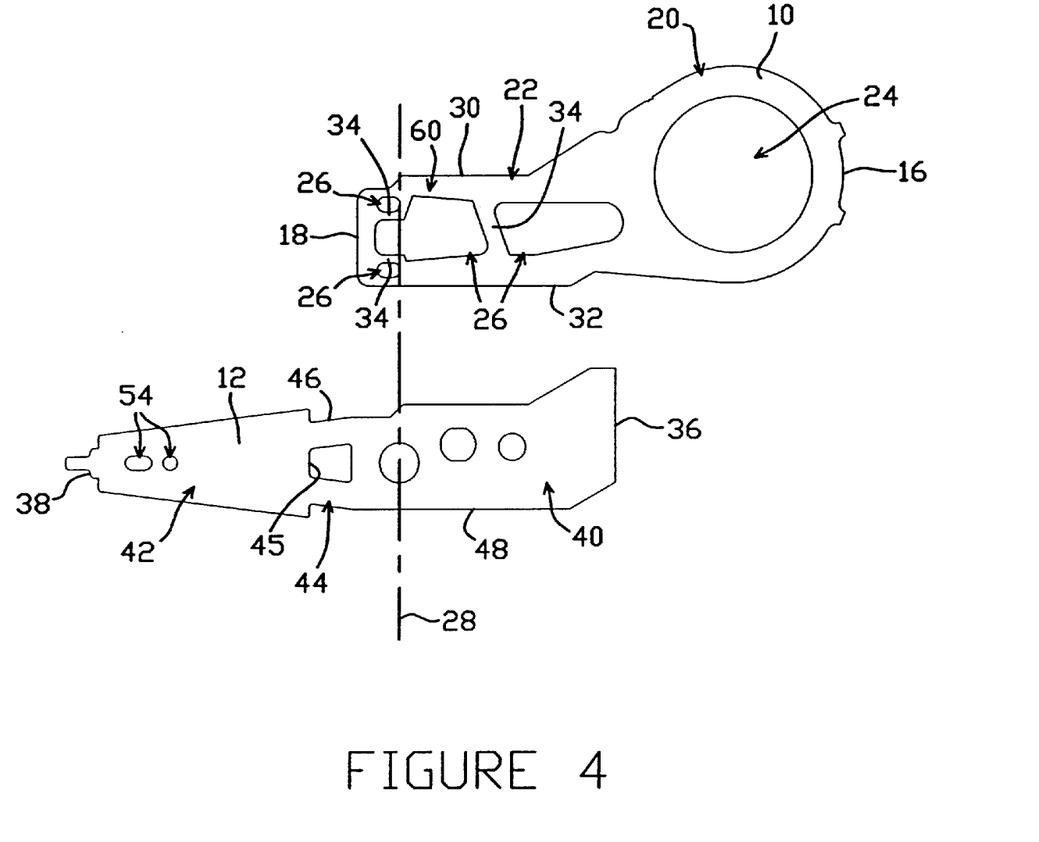
FIG. 4 is a plan view of the actuator arm and load beam of the embodiment of FIG. 2.

FIGS. 2, 3, and 4 show a first embodiment of the head suspension of the present invention constructed according to the method of the invention. The head suspension is basically comprised of an actuator arm 10, a load beam 12, and a flexure 14. The novel features of the invention in the FIG. 2 embodiment are in the construction of the actuator arm 10 and load beam 12 and their interconnection. The flexure 14 shown in the drawings is illustrative only and any type of flexure may be employed with the head suspension construction of FIG. 2. Therefore, the flexure 14 will not be described in detail. In the construction of FIG. 2, the actuator arm 10 and load beam 12 make up the two laminae that together produce the laminate construction of the head suspension.

The actuator arm 10 has a longitudinal length with opposite proximal 16 and distal 18 ends and adjacent proximal 20 and distal 22 regions. It is constructed of a thin sheet of stainless steel or other conventionally used materials and has a uniform thickness. The proximal region 20 of the actuator is that region that surrounds an aperture 24 that is employed in attaching the actuator arm proximal region directly on an actuator column of a rotary data storage device. Although the aperture 24 is shown as the method of attaching the actuator arm to the column, other conventional types of connectors may be employed in attaching the actuator arm to the column.

The distal region 22 of the actuator arm is that area of the arm that surrounds several holes 26 that pass completely through the arm in the distal region. Although one of the holes is employed as a tooling hole in properly positioning the actuator arm 10 and load beam 12 to each other when securing these component parts together as indicated by the dashed line 28 in FIGS. 3 and 4, the holes 26 are primarily employed to reduce the mass of the actuator arm in the distal region 22. The holes 26 may be made in the actuator arm by any conventional method. As best seen in FIGS. 3 and 4, the holes 26 are contained within the opposite lateral edges 30, 32 of the arm and can be given various different configurations. The holes 26 are separated from each other by cross braces 34 of the actuator arm that provide stabilization and increased torsional stiffness to the arm and also provide areas for spot welds or adhesives that secure the load beam 12 to the actuator arm 10.

The load beam 12 has a longitudinal length with opposite proximal 36 and distal 38 ends and opposite proximal 40 and distal 42 regions separated by a spring region 44 of the load beam. The load beam is constructed of a thin sheet of material such as stainless steel or other conventionally used material and generally has a uniform thickness along its length. Although a window 45 through the load beam is employed in reducing the load beam spring rate in the spring region 44, other methods of reducing the load beam spring rate in the spring region may be employed such as a partial thickness window or a partial thickness trough extending across the spring region 44 between the opposite lateral edges 46, 48 of the load beam. The load beam distal region 42 is provided with rails 50, 52 along its opposite lateral edges for additional stiffness. In other embodiments, the rails may not be present. Mass reduction holes 54 are also provided through the distal region 42, one of which is used as a tooling aperture in properly positioning the flexure 14 on the load beam as indicated by the dashed line 55, as is conventional. The proximal region 40 of the load beam is also provided with mass reduction holes 56, one of which is employed as a tooling aperture in properly positioning the load beam 12 relative to the actuator arm 10 when they are secured together. The mass reduction holes may also be used as alignment features when assembling the components or the actuator stack.

FIG. 2 shows the load beam 12 secured to the actuator arm 10 with the load beam proximal region 40 overlapping the actuator arm distal region 22. In attaching the load beam to the actuator arm, an interior surface 58 of the load beam proximal region 40 on the underside of the load beam as seen in FIGS. 2, 3, and 4 is secured to a mutually opposing interior surface 60 of the actuator arm distal region 22 by spot welds, adhesives or other equivalent methods. The two surfaces 58, 60 are referred to as interior surfaces because they oppose each other when the load beam is assembled to the actuator arm. As can be seen from the configurations of the holes 56 in the load beam proximal region and the holes 26 in the actuator arm distal region, the holes do not exactly coincide with each other and portions of the load beam proximal region 40 will overlap portions of the actuator arm holes 26, thereby defining an interior volume between the top surface 62 of the head suspension shown in FIG. 2 and the bottom surface 64 of the head suspension. The opposite top 62 and bottom 64 surfaces of the head suspension are flat, parallel surfaces and may be employed for the attachment of electrical conductors thereto. In the preferred embodiment, the opposite lateral edges 46, 48 of the load beam in the proximal region 40 coincide with the opposite lateral edges 30, 32 of the actuator arm in its distal region 22.

In constructing the head suspension with the laminate actuator arm and load beam structure described above, a more compact head suspension is achieved together with the advantages of minimizing inertia while increasing shock, resonance, and deflection performance. The laminate construction of the load beam proximal region 40 overlapping the holes 26 in the actuator arm distal region 22 provides a monocoque type structure with improved stiffness and reduced mass from other prior art constructions such as that shown in FIG. 1, which construction requires greater overall mass of the head suspension to achieve the same level of stiffness.

Figure 5:
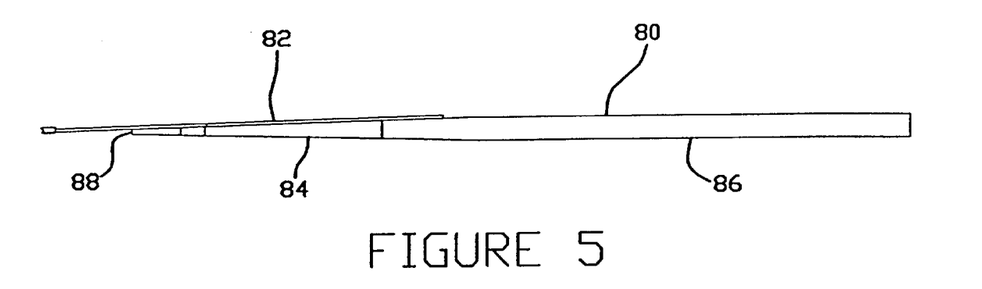
FIG. 5 is a side elevation view of a further embodiment of the head suspension.

FIG. 5 shows a side elevation view of an embodiment of the head suspension again comprised of an actuator arm 80 secured to a load beam 82 in which the mass of the actuator arm distal region 84 is reduced. In FIG. 5, it is seen that the actuator arm proximal region 86, which includes its connector (not shown) for attachment of the proximal region directly on an actuator column of a rotary data storage device, is of a uniform thickness. However, the thickness of the actuator arm distal region 84 decreases from the thickness of the actuator arm proximal region 86 to a smaller thickness of the actuator arm distal region as it extends from the proximal region to a distal end 88 of the arm. The area of greatest bending stress in the actuator arm is near the arm proximal region 86 where it connects to the actuator column of the rotary data storage device. Therefore, the proximal region requires more stiffness. The distal region 88 of the actuator arm that extends from the actuator column connector has little bending stress but contributes more significantly to rotary inertia, shock and resonance performance. By tapering the thickness of the actuator arm as it extends through its distal region 84 to the distal end 88 of the arm, a more efficient use of the mass of the arm is achieved in a similar manner to that of the previously described embodiments which employed holes in the distal region of the arm. In addition to the tapered configuration of the actuator arm distal region 84, holes in the distal region may also be employed as in the previously described embodiments.

Figure 6:
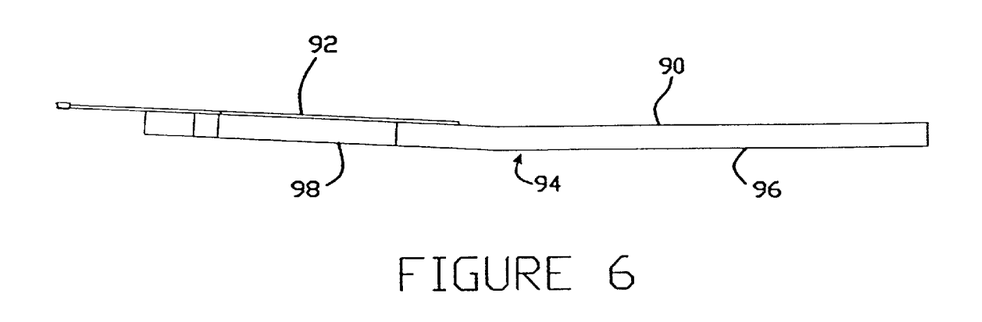
FIG. 6 is a side elevation view of a further embodiment of the head suspension.

FIG. 6 shows a further variation of the embodiments of the head suspension shown and described previously with reference to FIGS. 2–4. In the preferred embodiment of the head suspension, the actuator arm 90 will only have a load beam 92 secured on one side. Because the load beam 92 is secured to only one side of the actuator arm 90, in use the actuator arm will deflect by some amount under preload of the head suspension. It is preferred that adjacent actuator arms in a stack of actuator arms on a rotary data storage device actuator column not touch back to back near the distal ends. By putting a controlled bend 94 in the arm separating the proximal region 96 of the arm that includes the connector for the rotary data storage device actuator column (not shown) and the distal region 98 of the arm to which the load beam 92 is attached, the deflection of the arm due to the preload can be compensated for such that the distal ends of the arms will not touch when they are loaded. This permits greater design flexibility in arm design for shock, resonance, etc. Also, because the back to back deflection is limited, thicker arms could be used or disk spacing could be reduced.

Figure 7:
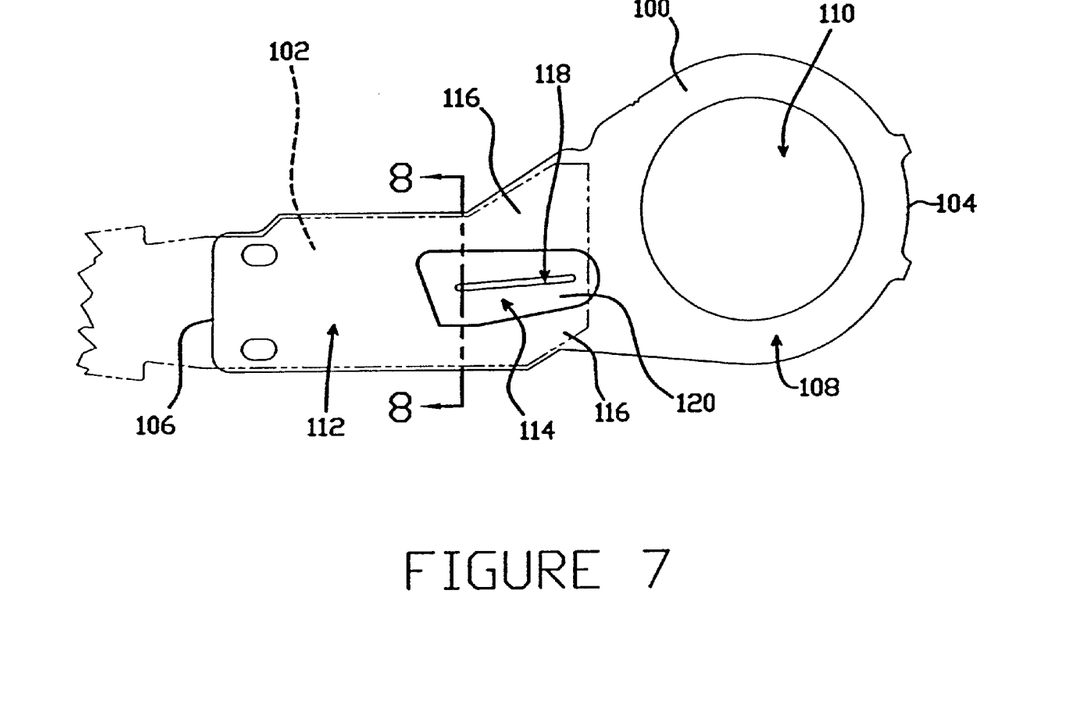
FIG. 7 is a partial plan view of an additional embodiment of the head suspension.
Figure 8:
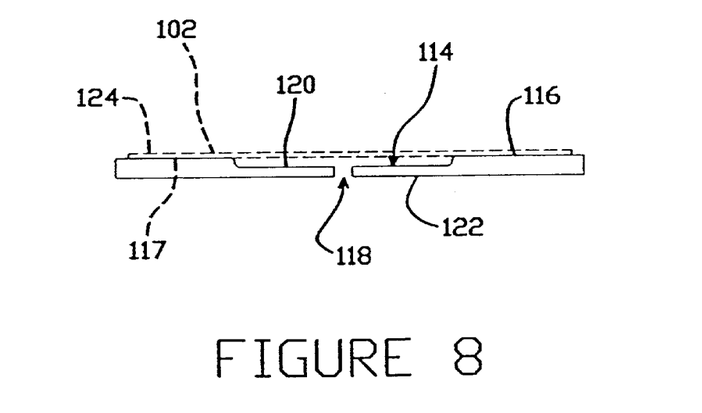
FIG. 8 is an elevation view, in section, of the head suspension of FIG. 7 taken along the line 8—8 of FIG. 7.

FIGS. 7 and 8 show a further variation in the actuator arm of FIG. 2 in which the hole in the actuator arm distal region is made differently than that in the previously described embodiments. In FIGS. 7 and 8, the actuator arm 100 is shown in full lines and the load beam proximal end 102 is shown in dashed lines. As in the previous embodiments, the actuator arm 100 has a longitudinal length with opposite proximal 104 and distal 106 ends. A proximal region 108 of the arm surrounds a rotary data storage device connector in the form of a connector aperture 110, although other known connectors may be employed. The arm distal region 112 projects from the proximal region 108 and has the hole 114 formed therein. In this embodiment, the hole 114 does not pass completely through the arm distal region 112 but extends into the arm from the arm interior surface 116 that opposes the interior surface 117 of the attached load beam proximal end 102. Again, the two surfaces are referred to as interior surface because they oppose each other in the interior of the head suspension when the load beam is secured to the actuator arm. In forming the hole 114, an expansion aperture 118 in the form of an elongate slot is first made through the arm distal region 112. The arm interior surface 116 is then coined or stamped to produce the hole 114 extending into the arm from its interior surface 116 to a recessed surface 120 of the hole within the arm. The expansion aperture 118 is provided to enable material of the arm displaced by coining the hole 114 to expand into the aperture as the hole is formed. This results in the hole 114 being formed in the aperture arm distal region 112 with the interior surface 116 of the arm and the bottom surface 122 of the head suspension remaining flat and parallel to each other. When the load beam proximal region 102 is secured to the arm distal region 112, it can be seen that the head suspension produced will have flat, parallel top 124 and bottom 122 surfaces. The elimination of the base plate in this construction achieves the goal of reducing the mass of the head suspension with a minimal reduction in stiffness.

Figure 9:
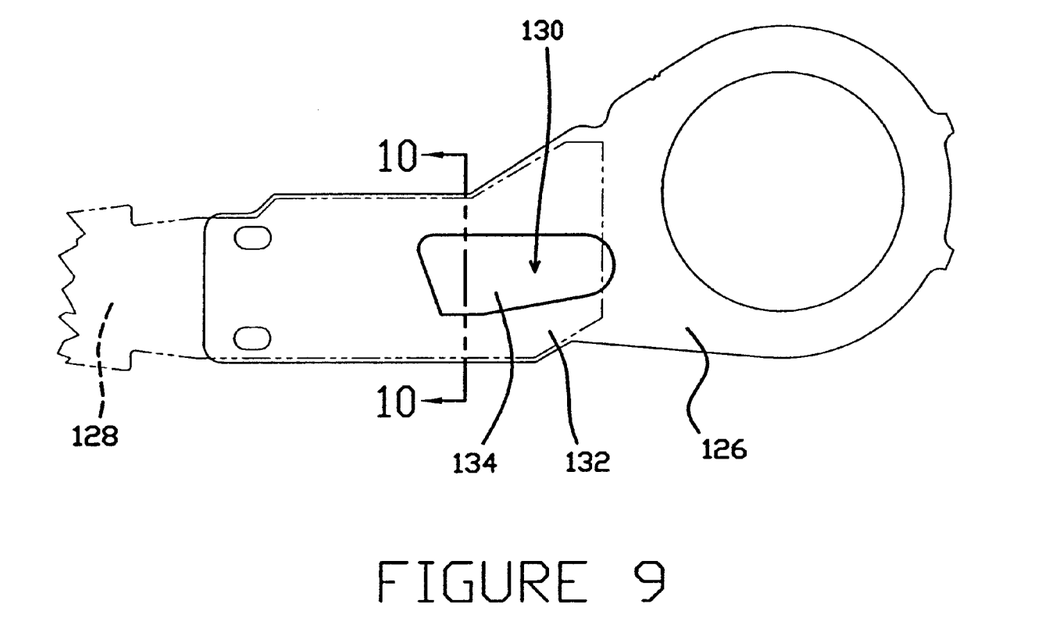
FIG. 9 is a partial plan view of an additional embodiment of the head suspension.
Figure 10:
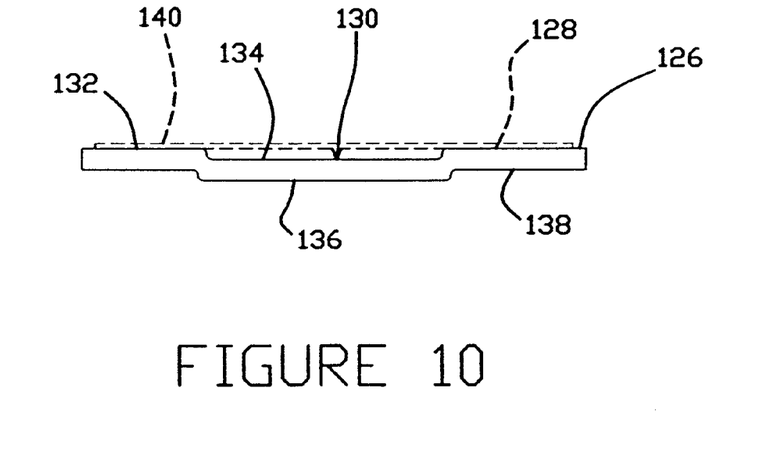
FIG. 10 is an elevation view, in section, of the head suspension of FIG. 9 taken along the line 10—10 of FIG. 9.

FIGS. 9 and 10 show a still further variation of the head suspension embodiment of FIGS. 7 and 8 in which the hole in the actuator arm distal region is made differently than that shown in the previously described embodiments. In FIGS. 9 and 10 the actuator arm 126 is shown in full lines and the load beam proximal end 128 is shown in dashed lines just as in FIGS. 7 and 8. The features of the actuator arm 126 and load beam proximal end 128 shown in FIGS. 9 and 10 are the same as those shown in FIGS. 7 and 8 and described earlier except for the construction of the hole 130. Therefore, only the construction of the hole 130 will be described here. As best seen in FIG. 10, the hole 130 does not extend completely through the actuator arm distal end but extends into the arm from the arm interior surface 132 to a recessed surface 134 of the hole. The hole 134 differs from the hole 114 of the FIGS. 7 and 8 embodiment in that it does not include an expansion aperture and it is formed in the arm interior surface 132 by being stamped into the surface. This results in the creation of a raised area 136 in the head suspension bottom surface 138 directly below the hole where the material of the arm displaced by the hole 130 extends into. When the load beam proximal end 128 is secured to the interior surface 132 of the actuator arm, the head suspension top surface 140 will be parallel with the head suspension bottom surface 138 except in the raised area 136 of the bottom surface resulting from the stamping of the hole 130.

FIGS. 11–14 illustrate a still further embodiment of the head suspension of the invention in which the actuator arm and load beam are formed as a single, monolithic unit.

The construction of the head suspension shown in FIGS. 11–15 is also a laminate construction with the unitary actuator arm 140 and load beam 142 as one of the laminae and an extended flexure 144 as the second of the laminae. Both laminae are constructed of stainless steel or other conventionally used materials.

Figure 11:
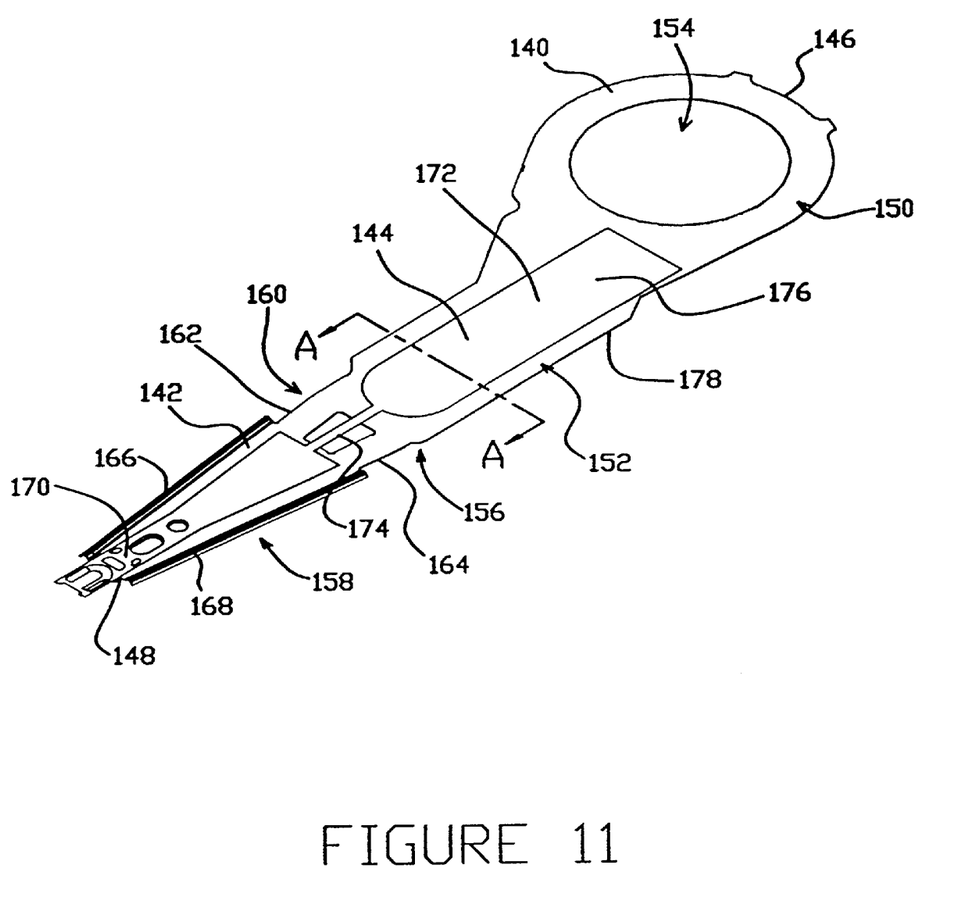
FIG. 11 is a isometric view of a further embodiment of the head suspension.
Figure 12:
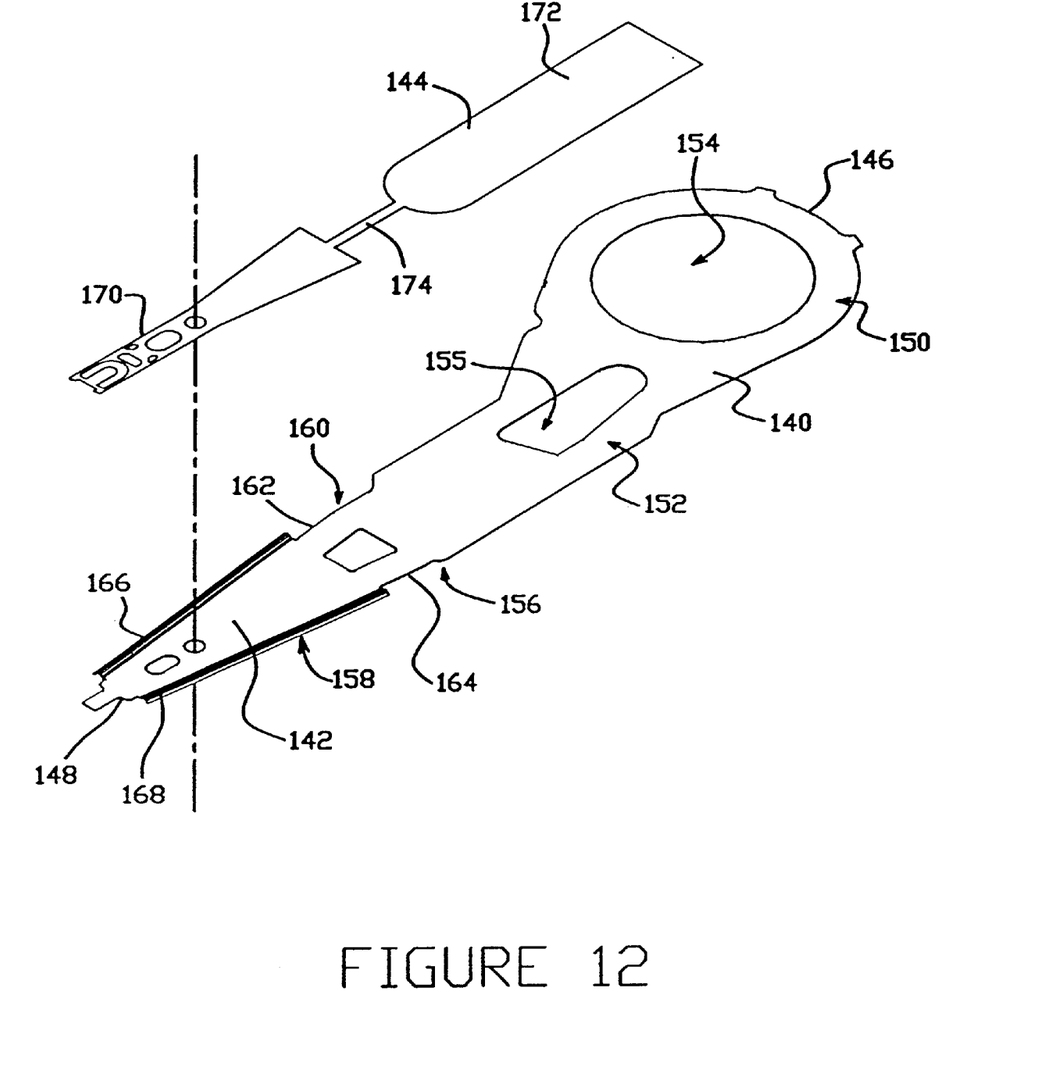
FIG. 12 is an exploded isometric view of the head suspension embodiment of FIG. 11.

The combined actuator arm 140 and load beam 142 are made from a single sheet of material and has a combined longitudinal length with opposite proximal 146 and distal 148 ends. The actuator arm portion 140 of the combination includes a proximal region 150 and a distal region 152 of the arm portion that are similar to those of the actuator arm 10 of the first described embodiment. The proximal region 150 surrounds a connector aperture 154 that is employed in attaching the combined actuator arm and load beam to the actuator 200 column of a rotary data storage device 202 (see figure 15). Alternatively, other methods of attaching the actuator arm portion 140 to the actuator column 200 may be employed. The distal region 152 of the actuator arm portion 140 has the mass reducing hole 155 formed therethrough. Although only one hole is shown, the hole is provided for the same purpose and is made in the same manner as the previously described embodiments. The distal region 152 of the combined actuator arm and load beam is connected integrally with the load beam 142 at a proximal region 156 of the load beam. The load beam proximal region 156 is separated from a distal region 158 of the load beam by a spring region 160. The load beam lateral edges 162, 164 are extensions of the lateral edges of the actuator arm 140, and portions of the opposite edges have rails 166, 168 formed therein just as in the load beam of the first described embodiment.

The flexure extension 144 is made with a flexure portion 170 and a laminae portion 172 that are attached by a narrow connector 174 that spans between them.

The flexure extension 144 is secured to the combined actuator arm 140 and load beam 142 in the position shown in FIG. 11. As seen in FIG. 11, the laminae portion 172 of the flexure extension completely covers over the hole 155 in the actuator arm distal region 152. This produces the monocoque construction of the previously described embodiments in which the reduction in stiffness resulting from the removal of material at the hole 155 is compensated for by the monocoque construction, thereby minimizing inertia from the reduced mass provided by the hole 155 without appreciably decreasing and preferably increasing shock, resonance and deflection performance of the head suspension. The connector 174 attaches the flexure portion 170 to the laminae portion 172 and enables both of these portions of the flexure extension 144 to be positioned together relative to the actuator arm 140 and load beam 142 combination when securing the flexure extension to the combination. The connector 174 is positioned relative to the flexure portion 170 and the laminae portion 172 where it will span across the spring region 160 of the load beam. The reduced lateral width of the connector 174 does not appreciably effect the spring rate of the load beam, and the presence of the connector 174 spanning the spring region 160 can be compensated for by reducing the spring rate of the spring region 160 by conventional methods. The flexure extension 144 is secured to the combined actuator arm 140 and load beam 142 by spot welds, adhesives or other equivalent methods and produces a head suspension having opposite top 176 and bottom 178 surfaces that are substantially parallel to each other and have therebetween the hollow interior volume of the hole 155 with its resulting reduced mass and minimized inertia.

As in previously described embodiments, the hole 155 may be formed completely through the distal region 152 of the actuator arm portion 140 of the head suspension.

Figure 13:
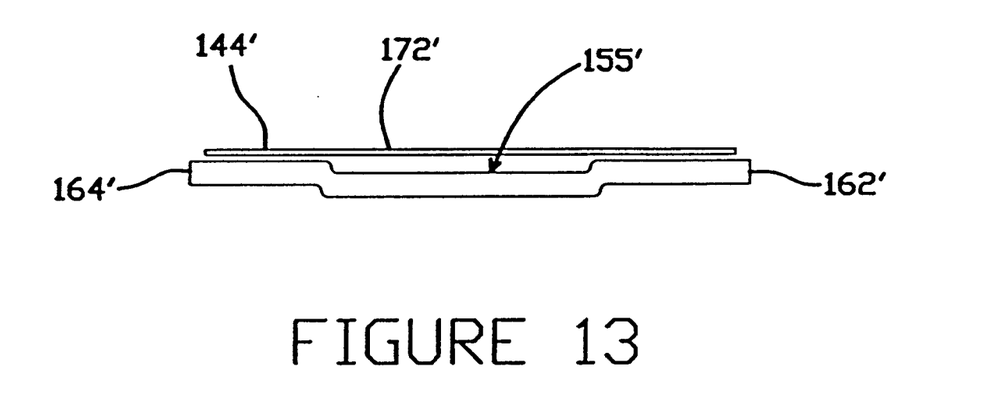
FIG. 13 is an elevation view, in section, of one embodiment of the head suspension of FIG. 11.
Figure 14:
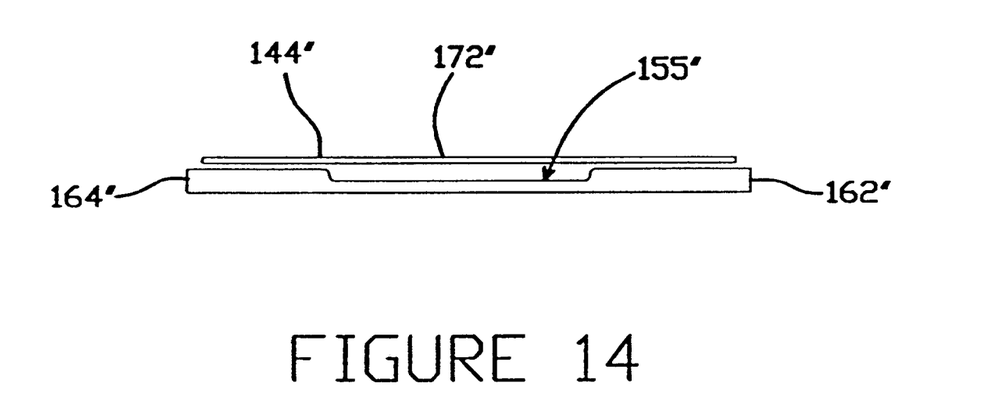
FIG. 14 is an elevation view, in section, of a variant embodiment of the head suspension of FIG. 11.

FIGS. 13 and 14 show alternative embodiments of the hole of the embodiment of FIGS. 11 and 12 that are stamped and partially etched into the actuator arm, respectively. Because these alternative methods of forming the hole 154 were described earlier with reference to FIGS. 7–10, they will not be described again herein. In FIGS. 13 and 14, like reference numerals used in the FIGS. 11 and 12 embodiment are used followed by a prime (') and a double prime ("), respectively.

Each of the described embodiments of the invention provide a head suspension having minimized rotational inertia while maintaining desirable levels of shock, resonance, and deflection performance. The monocoque construction produced by the laminae employed in each of the embodiments provides the advantages of higher shock and torsional resonance performance while minimizing rotational inertia in addition to the advantages of a more simplified, efficient and less expensively manufactured head suspension.

While the present invention has been described by reference to a specific embodiment, it should be understood that modifications and variations of the invention may be constructed without departing from the scope of the invention defined in the following claims.

What is claimed is:

1. A head suspension for supporting a read/write head adjacent a rotary data storage device, the head suspension comprising:

a load beam having a longitudinal length with opposite proximal and distal regions and a spring region therebetween;

an actuator arm having a longitudinal length with opposite proximal and distal regions, the proximal region of the actuator arm having an actuator connector structure thereon adapted for attachment on a head actuator column of a rotary data storage device and the distal region of the actuator arm having a hole therein, the distal region of the actuator arm being connected to the proximal region of the load beam with the proximal region of the load beam extending over and completely covering the hole in the actuator arm distal end.

2. The head suspension of claim 1, wherein:

the actuator arm has opposite top and bottom surfaces and the hole extends into the actuator arm from the top surface to a recessed surface inside the hole and between the top and bottom surfaces.

3. The head suspension of claim 2, wherein:

the actuator arm top and bottom surfaces are planar surfaces.

4. The head suspension of claim 3, wherein:

the hole is partially etched into the actuator arm top surface.

5. The head suspension of claim 3, wherein:

the hole is coined into the actuator arm top surface.

6. The head suspension of claim 5, wherein:

an expansion aperture passes through the actuator arm between the recessed surface and the bottom surface.

7. The head suspension of claim 1, wherein:

the hole passes completely through the distal region of the actuator arm.

8. The head suspension of claim 1, wherein:

the hole is one of a plurality of holes in the distal region of the actuator arm.

9. The head suspension of claim 1, wherein:

the actuator arm proximal region is positioned in a first plane and the actuator arm distal region is positioned in a second plane that is oriented at an angle relative to the first plane.

10. The head suspension of claim 1, wherein:

the actuator arm proximal region has a first thickness and the actuator arm distal region has a thickness that tapers from the first thickness at the actuator arm proximal region to a smaller, second thickness as the actuator arm distal region extends away from the actuator arm proximal region.

11. A head suspension for supporting a read/write head adjacent a data storage device, the head suspension having a longitudinal length and a lateral width, opposite top and bottom surfaces, an actuator connector structure for attachment on a head actuator of a data storage device, a resilient spring region formed in the suspension, and a rigid region between the spring region and the actuator connector structure which is constructed of first and second lamina having mutually opposed interior surfaces that are secured together, each of the first and second lamina has a thickness, and the interior surface of at least one of the first and second lamina has a hole therein which is completely covered by the other of the first and second lamina, the hole defining a hollow interior volume between the top and bottom surfaces.

12. The head suspension of claim 11 wherein the top and bottom surfaces are parallel to each other.

13. The head suspension of claim 11 wherein the interior surface of the one of the first and second lamina extends completely around the interior volume.

14. The head suspension of claim 11 wherein the head suspension top surface is on the first lamina opposite its interior surface and the head suspension bottom surface is on the second lamina opposite its interior surface.

15. The head suspension of claim 11 wherein each of the first and second lanina have proximal ends and a portion of one of the first and second lamina includes the actuator connector structure on its proximal end and extends longitudinally beyond the proximal end of the other of the first and second lamina.

16. The head suspension of claim 11 wherein each of the first and second lamina have distal ends and a portion of one of the first and second lamina adjacent its distal end extends longitudinally beyond the distal end of the other of the first and second lamina and has the head suspension spring region formed therein.

17. The head suspension of claim 11 wherein the interior surfaces of the first and second lamina are secured together by welds.

18. The head suspension of claim 11, wherein:

the first lamina is an actuator arm and the second lamina is a load beam and the hole extends into the actuator arm to a recessed surface inside the hole.

19. The head suspension of claim 11, wherein:

the first lamina is an actuator arm and the second lamina is a load beam and the hole extends completely through the actuator arm.

20. The head suspension of claim 11, wherein:

the first lamina is an actuator arm and the second lamina is a load beam, the hole is in the actuator arm and a portion of the load beam extends longitudinally adjacent and is spaced laterally to a side of the hole where the load beam is secured to the actuator arm.

21. The head suspension of claim 11, wherein:

the first lamina is a unitary actuator arm and load beam and the second lamina is an extended flexure, the hole is in the actuator arm of the unitary actuator arm and load beam and the hole is covered over by the extended flexure.

22. A method of manufacturing a head suspension for supporting a read/write head adjacent a data storage device, the method of manufacturing the head suspension comprising the steps of:

fabricating a load beam from a sheet of flat, resilient material, the load beam having a longitudinal length with opposite proximal and distal ends and opposite first and second surfaces;

fabricating an actuator arm from a sheet of flat material, the actuator arm having a longitudinal length with opposite proximal and distal ends and opposite first and second surfaces;

forming a hole in the first surface of the actuator arm;

attaching the first surface of the load beam to the first surface of the actuator arm with the first surface of the load beam extending over and completely covering the hole in the actuator arm, the hole defining a hollow interior volume between the load beam second surface and the actuator arm second surface.

23. The method of claim 22, further comprising:

making the hole completely through the actuator arm.

24. The method of claim 22, further comprising:

making the hole extend into the actuator arm to a recessed surface of the hole inside the actuator arm.

25. The method of claim 22, further comprising:

making a bend in the actuator arm between proximal and distal regions of the actuator arm, and making the hole in the distal region of the actuator arm.

* * * * *